United States Patent
Qiu et al.

(10) Patent No.: US 11,169,994 B2
(45) Date of Patent: Nov. 9, 2021

(54) QUERY METHOD AND QUERY DEVICE

(71) Applicant: Huawei Technologies Co., Ltd., Shenzhen (CN)

(72) Inventors: Lei Qiu, Beijing (CN); Maozeng Li, Beijing (CN); Haiyan Huang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 488 days.

(21) Appl. No.: 16/157,752

(22) Filed: Oct. 11, 2018

(65) Prior Publication Data

US 2019/0042621 A1 Feb. 7, 2019

Related U.S. Application Data

(63) Continuation of application No. PCT/CN2016/102589, filed on Oct. 19, 2016.

(30) Foreign Application Priority Data

May 18, 2016 (CN) .......................... 201610334617.6

(51) Int. Cl.
*G06F 16/24* (2019.01)
*G06F 16/2453* (2019.01)
*G06F 16/2455* (2019.01)

(52) U.S. Cl.
CPC .... *G06F 16/24542* (2019.01); *G06F 16/2454* (2019.01); *G06F 16/24532* (2019.01); *G06F 16/24539* (2019.01); *G06F 16/24552* (2019.01)

(58) Field of Classification Search
CPC ........... G06F 16/24542; G06F 16/2454; G06F 16/24539
See application file for complete search history.

(56) References Cited

U.S. PATENT DOCUMENTS 6,466,931 B1  10/2002 Attaluri et al.
6,570,555 B1*  5/2003 Prevost ..................... G06F 3/01
                                                                345/156

(Continued)

FOREIGN PATENT DOCUMENTS

CN     103324724 A    9/2013
CN     104216894 A   12/2014
(Continued)

OTHER PUBLICATIONS

Foreign Communication From a Counterpart Application, Chinese Application No. 201610334617.6, Chinese Office Action dated Jun. 24, 2019, 8 pages.

(Continued)

*Primary Examiner* — Eliyah S. Harper
(74) *Attorney, Agent, or Firm* — Conley Rose, P.C.

(57) ABSTRACT

A query method and a query device, where the method includes determining N execution plans respectively corresponding to N query requests according to the received N query requests, determining at least two same first sub-plans, generating a first sub-query result corresponding to any one of the at least two same first sub-plans, and in a process of generating, according to the N query requests, a query result corresponding to each of the N query requests, the same first sub-query result corresponding to any one of the first sub-plans is used for all the same first sub-plans. Hence, a large amount of repeated calculation can be reduced, database system resources are reduced, and query efficiency and a throughput of a database system in a large-scale concurrent query application scenario are improved.

20 Claims, 6 Drawing Sheets

(56) References Cited

U.S. PATENT DOCUMENTS

| | | | |
|---|---|---|---|
| 6,581,055 B1* | 6/2003 | Ziauddin | G06F 16/24547 |
| 7,716,212 B2* | 5/2010 | Azizi | G06F 16/283 |
| | | | 707/718 |
| 7,831,569 B2 | 11/2010 | Bestgen et al. | |
| 8,312,000 B1 | 11/2012 | Burger et al. | |
| 8,645,356 B2 | 2/2014 | Bossman et al. | |
| 2003/0110192 A1* | 6/2003 | Valente | H04L 41/0893 |
| | | | 715/234 |
| 2004/0220896 A1* | 11/2004 | Finlay | G06F 16/24537 |
| 2005/0097083 A1 | 5/2005 | Barsness et al. | |
| 2005/0149584 A1* | 7/2005 | Bourbonnais | G06F 16/256 |
| 2005/0165801 A1 | 7/2005 | Sethi et al. | |
| 2005/0182773 A1* | 8/2005 | Feinsmith | G06Q 10/10 |
| 2005/0240570 A1 | 10/2005 | Ozbutun | |
| 2008/0256024 A1 | 10/2008 | Downer et al. | |
| 2010/0257576 A1* | 10/2010 | Valente | H04L 63/102 |
| | | | 726/1 |
| 2010/0293156 A1* | 11/2010 | Tanaka | G06F 16/217 |
| | | | 707/718 |
| 2013/0159283 A1 | 6/2013 | Broll et al. | |
| 2013/0262435 A1 | 10/2013 | Bossman et al. | |
| 2014/0019435 A1* | 1/2014 | Ceri | G06Q 10/10 |
| | | | 707/712 |
| 2014/0095475 A1 | 4/2014 | Su et al. | |
| 2016/0350372 A1 | 12/2016 | Liu et al. | |

FOREIGN PATENT DOCUMENTS

| | | |
|---|---|---|
| WO | 03056466 A1 | 7/2003 |
| WO | 2005106717 A1 | 11/2005 |

OTHER PUBLICATIONS

Machine Translation and Abstract of Chinese Publication No. CN103324724, Sep. 25, 2013, 19 pages.

Sellis, T., "Multiple-Query Optimization," XP000718757, Mar. 1988, pp. 23-52.

Psaroudakis, I., et al., "Reactive and Proactive Sharing Across Concurrent Analytical Queries," XP055515003, 2014, pp. 889-892.

Harizopoulos, S., et al., "QPipe: A Simultaneously Pipelined Relational Query Engine," XP058158632, Jun. 14, 2005, pp. 383-394.

Foreign Communication From a Counterpart Application, European Application No. 16902210.0, Extended European Search Report dated Oct. 22, 2018, 11 pages.

Foreign Communication From a Counterpart Application, PCT Application No. PCT/CN2016/102589, English Translation of International Search Report dated Feb. 22, 2017, 2 pages.

\* cited by examiner

QUERY METHOD AND QUERY DEVICE

CROSS-REFERENCE TO RELATED APPLICATIONS

This application is a continuation of International Patent Application No. PCT/CN2016/102589 filed on Oct. 19, 2016, which claims priority to Chinese Patent Application No. 201610334617.6 filed on May 18, 2016. The disclosures of the aforementioned applications are hereby incorporated by reference in their entireties.

TECHNICAL FIELD

The present disclosure relates to database technologies, and in particular, to a query method and a query device that can implement large-scale concurrent queries.

BACKGROUND

Large-scale concurrent queries are an important database application scenario in an era of big data, and are also an important criterion for checking a database capability. The large-scale concurrent queries consume a large quantity of database system resources in an extremely short time, and impose extremely high pressure on a database system. A query response time needs to be controlled within a tolerable range in order to ensure that a user can quickly obtain a query result. In a large-scale concurrent query application scenario, database pressure increases sharply in a short period of time, but a peak lasts for a relatively short time.

According to a large-scale concurrent query method provided in other approaches, multiple queries are compiled together, that is, a query 1, a query 2, and a query 3 that are shown in FIG. 1 are compiled together to form an integrated execution plan. The integrated execution plan is executed in one time, and all query results are output at a same time. As shown in FIG. 1, a query result of the query 1, a query result of the query 2, and a query result of the query 3 are output at the same time. As a whole, the integrated execution plan needs to be generated by all queries in one time, and cannot be split into single execution plans. However, when a query changes, the entire integrated execution plan needs to be regenerated. The integrated execution plan is a static structure, and cannot be split for execution. Therefore, each time the integrated execution plan is executed, all included queries are executed once.

The large-scale concurrent query method in the other approaches is suitable for a fixed query scenario. However, in actual application, a query often changes, and the entire integrated execution plan changes if one of multiple queries changes. Consequently, a long time for generating the execution plan is wasted, a query response time is prolonged, and query efficiency is reduced.

SUMMARY

Embodiments of the present disclosure provide to a query method and a query device that can implement large-scale concurrent queries.

A first aspect of the embodiments of the present disclosure provides a query method, including the following steps.

Step 1: Receive N query requests.

N is a positive integer greater than 1.

Further, a database system in the embodiments may receive, in a data query scenario, the N query requests entered by a user.

The data query scenario is not limited in the embodiments, such as a large-scale concurrent query application scenario of college entrance examination result query, or a large-scale concurrent query application scenario of bank database system ad hoc query.

Step 2: Determine execution plans corresponding to the query requests.

Further, the database system can determine N execution plans according to the N query requests, and the N execution plans correspond one-to-one to the N query requests.

Each of the N execution plans includes multiple sub-plans, and each sub-plan further includes multiple operators.

The operators included in the sub-plan shown in embodiments are connected according to a tree structure. Each sub-plan includes an execution sequence and an invoking relationship of the operators.

Step 3: Determine at least two same first sub-plans.

The at least two same first sub-plans are determined from the N execution plans respectively corresponding to the N query requests.

The at least two same first sub-plans are different execution plans in the N execution plans, or the at least two same first sub-plans are same execution plans in the N execution plans.

Further, the at least two same first sub-plans include a same operator, and operators of the at least two same first sub-plans have same execution sequences and invoking relationships.

Step 4: Select any one of the at least two same first sub-plans, and generate a first sub-query result corresponding to the selected first sub-plan.

In the embodiments, the database system may create a running set. The database system may select any first sub-plan, and puts the first sub-plan into the running set.

The database system generates a first sub-query result corresponding to the first sub-plan in the running set.

The first sub-query result corresponding to the first sub-plan in the running set is used for a first sub-plan that is not in the running set.

Step 5: Determine at least two mutually different second sub-plans.

The at least two mutually different second sub-plans are different execution plans in the N execution plans, and/or the at least two mutually different second sub-plans are same execution plans in the N execution plans.

The database system may put the at least two mutually different second sub-plans into the running set such that all sub-plans in the running set are mutually different.

Step 5 and steps 3 and 4 are not performed in sequence.

Step 6: Generate second sub-query results corresponding to the second sub-plans.

Further, the database system may generate second sub-query results separately corresponding to the at least two mutually different second sub-plans.

Step 7: Generate query results corresponding to all the received query requests.

Further, a query result corresponding to each of the N query requests is generated based on the first sub-query result and the second sub-query results.

A data cache of the database system shown in the embodiments does not store the query results such that storage load of the database system is relieved, and cache utilization of the database system is improved.

According to the query method shown in the embodiments, in a process of querying data according to received multiple query requests, a same first sub-query result may be used for mutually different first sub-plans, and a database system does not need to generate a first sub-query result corresponding to each first sub-plan such that a large amount of repeated calculation can be reduced, database system resources are reduced, and query efficiency and a throughput of the database system in a large-scale concurrent query application scenario are improved.

With reference to the first aspect of the embodiments of the present disclosure, in a first implementation manner of the first aspect of the embodiments of the present disclosure, in a manner of performing step 2, the database system may determine a first query request set.

The first query request set includes at least one of the N query requests, an execution plan corresponding to each query request in the first query request set has been stored in a plan cache, and the plan cache is used to store an execution plan corresponding to the at least one of the N query requests.

The database system may directly obtain the execution plan that has been stored in the plan cache and that is corresponding to each query request in the first query request set.

It can be learnt that, according to the query method shown in the embodiments, if a received query request is a queried query request, an execution plan corresponding to the queried query request is directly obtained, and an execution plan does not need to be repeatedly generated such that duration for generating the execution plan is reduced.

With reference to the first aspect of the embodiments of the present disclosure, in a second implementation manner of the first aspect of the embodiments of the present disclosure, in a manner of performing step 2, a second query request set is determined.

The second query request set includes at least one of the N query requests, an execution plan corresponding to each query request in the second query request set is not stored in a plan cache, and the plan cache is used to store an execution plan corresponding to the at least one of the N query requests.

The execution plan corresponding to each query request in the second query request set is generated.

It can be learnt that, according to the query method shown in the embodiments, only if a received query request is a query request that has not been queried, the database system calculates an execution plan corresponding to the query request that has not been queried, and does not repeatedly generate an execution plan such that duration for generating the execution plan is reduced.

With reference to the method in any one of the first aspect of the embodiments of the present disclosure to the second implementation manner of the first aspect of the embodiments of the present disclosure, in a third implementation manner of the first aspect of the embodiments of the present disclosure, before step 1 is performed, the database system needs to determine a quantity of received query requests.

A specific process of determining the quantity of received query requests is as follows.

The database system first queries M query requests received by a database, and the M query requests are stored in a plan cache of the database system.

The M query requests stored in the plan cache of the database system are query requests that have been queried.

The M query requests that have been queried mean that the database system has generated, according to the M query requests, a query result corresponding to each of the M query requests.

The database system may calculate total duration in which the M query results are generated according to the M query requests, and the M query results are respectively corresponding to the M query requests.

The database system determines average query duration, and the average query duration is the total duration in which the M query results are generated according to the M query requests/M.

The database system determines a preset time period, and the preset time period is far less than the average query duration.

In a process of performing step 1, the database system may receive the N query requests in the preset time period, and the database system may not receive a query request any more after the preset time period expires.

In the embodiments, a database system may query data according to query requests received in a preset time period, and delete, when a query is completed in a preset time period, a query result stored in a data cache such that storage load of a database system is relieved, and cache utilization of the database system is improved.

With reference to the method in any one of the first aspect of the embodiments of the present disclosure to the second implementation manner of the first aspect of the embodiments of the present disclosure, in a fourth implementation manner of the first aspect of the embodiments of the present disclosure, before step 1 is performed, the database system needs to determine a quantity of received query requests.

A specific process of determining the quantity of received query requests includes determining whether a quantity N of received query requests is less than a target quantity, and if the quantity N of received query requests is less than the target quantity, continuing to receive a query request, or if the quantity N of received query requests is greater than or equal to the target quantity, receiving no more query requests.

In the embodiments, a database system continues to receive a query request only when a quantity N of received query requests is less than a target quantity, and receives no more query requests when the quantity N of received query requests is greater than or equal to the target quantity. When the quantity N of received query requests is greater than or equal to the target quantity, the database system may query data, and may delete, after the data is queried, a query result stored in a data cache such that storage load of the database system is relieved, and cache utilization of the database system is improved.

With reference to the method in any one of the first aspect of the embodiments of the present disclosure to the fourth implementation manner of the first aspect of the embodiments of the present disclosure, in a fifth implementation manner of the first aspect of the embodiments of the present disclosure, a step that may be further performed after step 4 is as follows.

A same address in a data cache is allocated to all the at least two same first sub-plans, where the data cache is used to store the first sub-query result corresponding to any one of the at least two same first sub-plans.

A database system may allocate a same address in a data cache to all same first sub-plans such that input of upper-layer operators of all the same first sub-plans points to the same data cache, and a same first sub-query result is used for the same first sub-plans. Therefore, a large amount of repeated calculation is reduced, database system resources are reduced, and query efficiency and a throughput of the database system in a large-scale concurrent query application scenario are improved.

With reference to the method in any one of the first aspect of the embodiments of the present disclosure to the fourth implementation manner of the first aspect of the embodiments of the present disclosure, in a sixth implementation manner of the first aspect of the embodiments of the present disclosure, a step that may be further performed after step 4 is as follows.

A hyperlink is set in each of the at least two same first sub-plans, where the hyperlink is used to indicate all same first sub-plans.

The hyperlink is used to indicate all same first sub-plans.

It can be learnt that a database system can determine all same first sub-plans using a hyperlink.

With reference to the sixth implementation manner of the first aspect of the embodiments of the present disclosure, in a seventh implementation manner of the first aspect of the embodiments of the present disclosure, the hyperlink is set in a highest-level operator of each of the at least two same first sub-plans, where the highest-level operator of each of the at least two same first sub-plans is the last operator executed in each of the at least two same first sub-plans.

With reference to the sixth implementation manner of the first aspect of the embodiments of the present disclosure or the seventh implementation manner of the first aspect of the embodiments of the present disclosure, in an eighth implementation manner of the first aspect of the embodiments of the present disclosure, the database system may allocate the same address in the data cache to hyperlinks of all the same first sub-plans such that input of upper-layer operators of all the same first sub-plans points to the same data cache, and a same first sub-query result is used for the same first sub-plans.

Input of upper-layer operators of same first sub-plans corresponds to a same data cache, and therefore, a same first sub-query result may be used for mutually different first sub-plans, and a database system does not need to generate a first sub-query result corresponding to each first sub-plan such that a large amount of repeated calculation can be reduced, database system resources are reduced, and query efficiency and a throughput of the database system in a large-scale concurrent query application scenario are improved.

A second aspect of the embodiments of the present disclosure provides a query device, including a first receiving unit configured to perform step 1, where the first receiving unit is configured to receive N query requests, and N is a positive integer greater than 1, a first determining unit configured to perform step 2, where the first determining unit is configured to determine N execution plans according to the N query requests, the N execution plans correspond one-to-one to the N query requests, and each of the N execution plans includes multiple sub-plans, a second determining unit configured to perform step 3, where the second determining unit is configured to determine at least two same first sub-plans, and the at least two same first sub-plans are different execution plans in the N execution plans, or the at least two same first sub-plans are same execution plans in the N execution plans, a first generation unit configured to perform step 4, where the first generation unit is configured to generate a first sub-query result corresponding to any one of the at least two same first sub-plans such that the same first sub-query result is used for all the at least two same first sub-plans, a third determining unit configured to perform step 5, where the third determining unit is configured to determine at least two mutually different second sub-plans, and the at least two mutually different second sub-plans are different execution plans in the N execution plans, and/or the at least two mutually different second sub-plans are same execution plans in the N execution plans, a second generation unit configured to perform step 6, the second generation unit is configured to generate second sub-query results separately corresponding to the at least two mutually different second sub-plans, and a third generation unit configured to perform step 7, the third generation unit is configured to generate, based on the first sub-query result and the second sub-query results, a query result corresponding to each of the N query requests.

According to the query device shown in the embodiments, in a process of querying data according to received multiple query requests, a same first sub-query result may be used for mutually different first sub-plans, and the query device does not need to generate a first sub-query result corresponding to each first sub-plan such that a large amount of repeated calculation can be reduced, a query device resource is saved, and query efficiency and a throughput of the query device in a large-scale concurrent query application scenario are improved.

With reference to the second aspect of the embodiments of the present disclosure, in a first implementation manner of the second aspect of the embodiments of the present disclosure, the first determining unit includes a first determining module configured to determine a first query request set, where the first query request set includes at least one of the N query requests, an execution plan corresponding to each query request in the first query request set has been stored in a plan cache, and the plan cache is used to store an execution plan corresponding to the at least one of the N query requests, and an obtaining module configured to obtain the execution plan that has been stored in the plan cache and that is corresponding to each query request in the first query request set.

It can be learnt that, according to the query device shown in the embodiments, if a query request received by the query device is a queried query request, an execution plan corresponding to the queried query request is directly obtained, and an execution plan does not need to be repeatedly generated such that duration for generating the execution plan is reduced.

With reference to the second aspect of the embodiments of the present disclosure, in a second implementation manner of the second aspect of the embodiments of the present disclosure, the first determining unit includes a second determining module configured to determine a second query request set, where the second query request set includes at least one of the N query requests, an execution plan corresponding to each query request in the second query request set is not stored in a plan cache, and the plan cache is used to store an execution plan corresponding to the at least one of the N query requests, and a generation module configured to generate the execution plan corresponding to each query request in the second query request set.

It can be learnt that, according to the query device shown in the embodiments, only if a received query request is a query request that has not been queried, the query device calculates an execution plan corresponding to the query request that has not been queried, and does not repeatedly generate an execution plan such that duration for generating the execution plan is reduced.

With reference to the query device in any one of the second aspect of the embodiments of the present disclosure to the second implementation manner of the second aspect of the embodiments of the present disclosure, in a third implementation manner of the second aspect of the embodiments of the present disclosure, the query device further includes a fourth determining unit configured to determine M received query requests, where M is a positive integer greater than 1, a calculation unit configured to calculate total duration in which M query results are generated according to the M query requests, where the M query results are respectively corresponding to the M query requests, and a fifth determining unit configured to determine average query duration, where the average query duration is the total duration in which the M query results are generated according to the M query requests/M, and a sixth determining unit configured to determine a preset time period, where the preset time period is less than the average query duration, and the first determining unit is further configured to receive the N query requests in the preset time period.

In the embodiments, the query device may query data according to query requests received in a preset time period, and delete, when a query is completed in a preset time period, a query result stored in a data cache such that storage load of the query device is relieved, and cache utilization of the query device is improved.

With reference to the query device in any one of the second aspect of the embodiments of the present disclosure to the second implementation manner of the second aspect of the embodiments of the present disclosure, in a fourth implementation manner of the second aspect of the embodiments of the present disclosure, the first receiving unit further includes a third determining module configured to determine whether a quantity N of received query requests is less than a target quantity, a fourth determining module configured to continue to receive a query request if the third determining module determines that the quantity N of received query requests is less than the target quantity, and a fifth determining module configured to receive no more query requests if the third determining module determines that the quantity N of received query requests is greater than or equal to the target quantity.

In the embodiments, the query device continues to receive a query request only when a quantity N of received query requests is less than a target quantity, and receives no more query requests when the quantity N of received query requests is greater than or equal to the target quantity. When the quantity N of received query requests is greater than or equal to the target quantity, the query device may query data, and may delete, when the data is queried, a query result stored in a data cache such that storage load of the query device is reduced, and cache utilization of the query device is improved.

With reference to the query device in any one of the second aspect of the embodiments of the present disclosure to the fourth implementation manner of the second aspect of the embodiments of the present disclosure, in a fifth implementation manner of the second aspect of the embodiments of the present disclosure, the query device further includes a first allocation unit configured to allocate a same address in a data cache to all the at least two same first sub-plans, where the data cache is used to store the first sub-query result corresponding to any one of the at least two same first sub-plans.

The query device may allocate the same address in the data cache to all the same first sub-plans such that input of upper-layer operators of all the same first sub-plans points to the same data cache, and a same first sub-query result is used for the same first sub-plans. Therefore, a large amount of repeated calculation is reduced, a query device resource is saved, and query efficiency and a throughput of the query device in a large-scale concurrent query application scenario are improved.

With reference to the query device in any one of the second aspect of the embodiments of the present disclosure to the fourth implementation manner of the second aspect of the embodiments of the present disclosure, in a sixth implementation manner of the second aspect of the embodiments of the present disclosure, the query device further includes a second allocation unit configured to set a hyperlink in each of the at least two same first sub-plans, where the hyperlink is used to indicate all same first sub-plans.

With reference to the sixth implementation manner of the second aspect of the embodiments of the present disclosure, in a seventh implementation manner of the second aspect of the embodiments of the present disclosure, the second allocation unit is further configured to set the hyperlink in a highest-level operator of each of the at least two same first sub-plans, where each of the at least two same first sub-plans includes multiple operators connected according to an execution sequence, a lower-level operator outputs a calculation result to an upper-level operator, and the highest-level operator of each of the at least two same first sub-plans is the last operator executed in each of the at least two same first sub-plans.

With reference to the sixth implementation manner of the second aspect of the embodiments of the present disclosure or the seventh implementation manner of the second aspect of the embodiments of the present disclosure, in an eighth implementation manner of the second aspect of the embodiments of the present disclosure, the query device further includes a third allocation unit configured to allocate the same address in the data cache to the hyperlinks that are set in all the at least two same first sub-plans.

According to the query device shown in the embodiments, a same address in a data cache may be allocated to hyperlinks of all same first sub-plans such that input of upper-layer operators of the same first sub-plans points to the same data cache, and a same first sub-query result is used for the same first sub-plans.

Input of upper-layer operators of same first sub-plans corresponds to a same data cache, and therefore, a same first sub-query result may be used for mutually different first sub-plans, and the query device does not need to generate a first sub-query result corresponding to each first sub-plan such that a large amount of repeated calculation can be reduced, a query device resource is saved, and query efficiency and a throughput of the query device in a large-scale concurrent query application scenario are improved.

The embodiments of the present disclosure disclose a query method and a query device. According to the method, N execution plans respectively corresponding to N query requests may be determined according to the received N query requests, at least two same first sub-plans are determined, a first sub-query result corresponding to any one of the at least two same first sub-plans is generated, and in a process of generating, according to the N query requests, a query result corresponding to each of the N query requests, the same first sub-query result is used for the at least two same first sub-plans such that a same first sub-query result corresponding to any one of the first sub-plans is used for all the same first sub-plans. It can be learnt that, according to the method shown in the embodiments, a large amount of repeated calculation can be reduced, database system resources are reduced, and query efficiency and a throughput of a database system in a large-scale concurrent query application scenario are improved.

DESCRIPTION OF EMBODIMENTS

Figure 1:
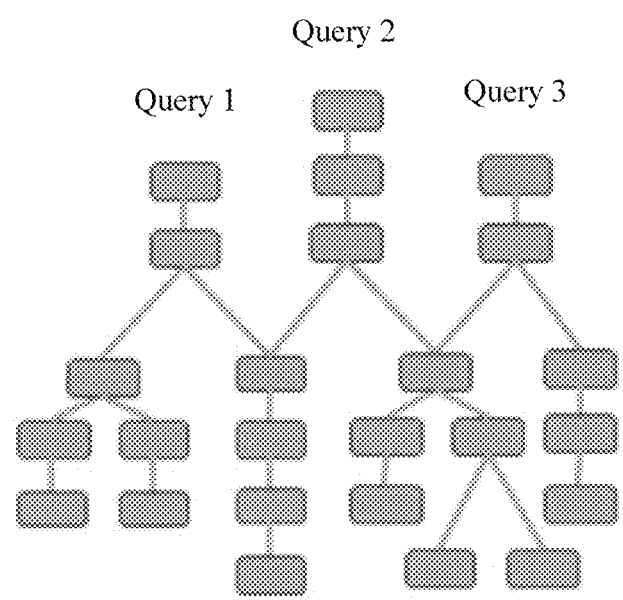
FIG. 1 is a schematic diagram of a query in an embodiment of a large-scale concurrent query.

For better understanding of embodiments of the present disclosure, the following first describes a scenario to which the embodiments of the present disclosure are applied.

A query method shown in the embodiments of the present disclosure is applied to a large-scale concurrent query application scenario.

Further, the large-scale concurrent query application scenario may be college entrance examination result query, lottery result query, bank database system ad hoc query, or the like.

It should be noted that examples of the large-scale concurrent query application scenario in the embodiments are optional examples, and are not limited.

Features of large-scale concurrent queries are as follows.

1. After preparation for a period of time, data is entered into a query device, and a database system is running on the query device. When starting a query, the database system provides a data query service in a read-only manner, and a query service time is relatively fixed.

For example, in a large-scale concurrent query application scenario of college entrance examination result query, college entrance examination results of a large quantity of examinees are entered into a query device, and the query device provides a college entrance examination result query service only in a specific query service time. The examinees query college entrance examination results in the time in which the query device provides the query service.

For another example, in a large-scale concurrent query application scenario of bank database system ad hoc query, staffs usually analyze and collect data of a day at night, and enter the data into a query device, and the query device generates collected data before work in a next morning. During work, the staffs first perform a service-related ad hoc query according to data collected in a previous day to generate a report of a current day, and guide a service behavior in the current day according to the report of the current day. A query service time in which a bank database system receives the ad hoc query from the staffs is usually one to two hours before work in the morning.

2. There are high query concentration and high instant concurrency, that is, in a query service time, a large quantity of concurrent queries enter into a database system, both an average value and a peak value of database system pressure are large, and there are usually thousands of queries in every second. This is a great test to a bearer capability of the database system.

For example, in the large-scale concurrent query application scenario of college entrance examination result query, a large quantity of examinees need to query college entrance examination results in the query service time.

For another example, in the large-scale concurrent query application scenario of bank database system ad hoc query, a large quantity of bank staffs perform an ad hoc query in the query service time.

3. There is high query similarity, and a large amount of repeated calculation is performed. Queries often include many same or similar sub-queries, the queries have similar service logic, and only a few conditions or results are different.

For example, in the large-scale concurrent query application scenario of college entrance examination result query, during college entrance examination result query, sub-queries connected to all subjects are the same, and an only difference is names of the examinees.

4. There is low query repetition, and many queries are executed only once. Although there are high query concurrency and high similarity, a single query often appears once, and does not appear again in the query service time after the current query is completed.

For example, in the large-scale concurrent query application scenario of bank database system ad hoc query, after querying a report of a previous work day, a service manager usually does not repeatedly submit the query in a current day, and does not perform a query again until data is updated in a next day.

5. The query has a relatively high requirement on a response time. With great load, a database system needs to ensure that response times of all queries are not significantly different in order to treat every query fairly and equally. This imposes a quite demanding requirement on resource utilization and work efficiency of the database system.

With reference to the large-scale concurrent query application scenario shown above, with reference to the accompanying drawings, a specific implementation process of the query method provided in the embodiments of the present disclosure is described in detail in the following.

Figure 2:
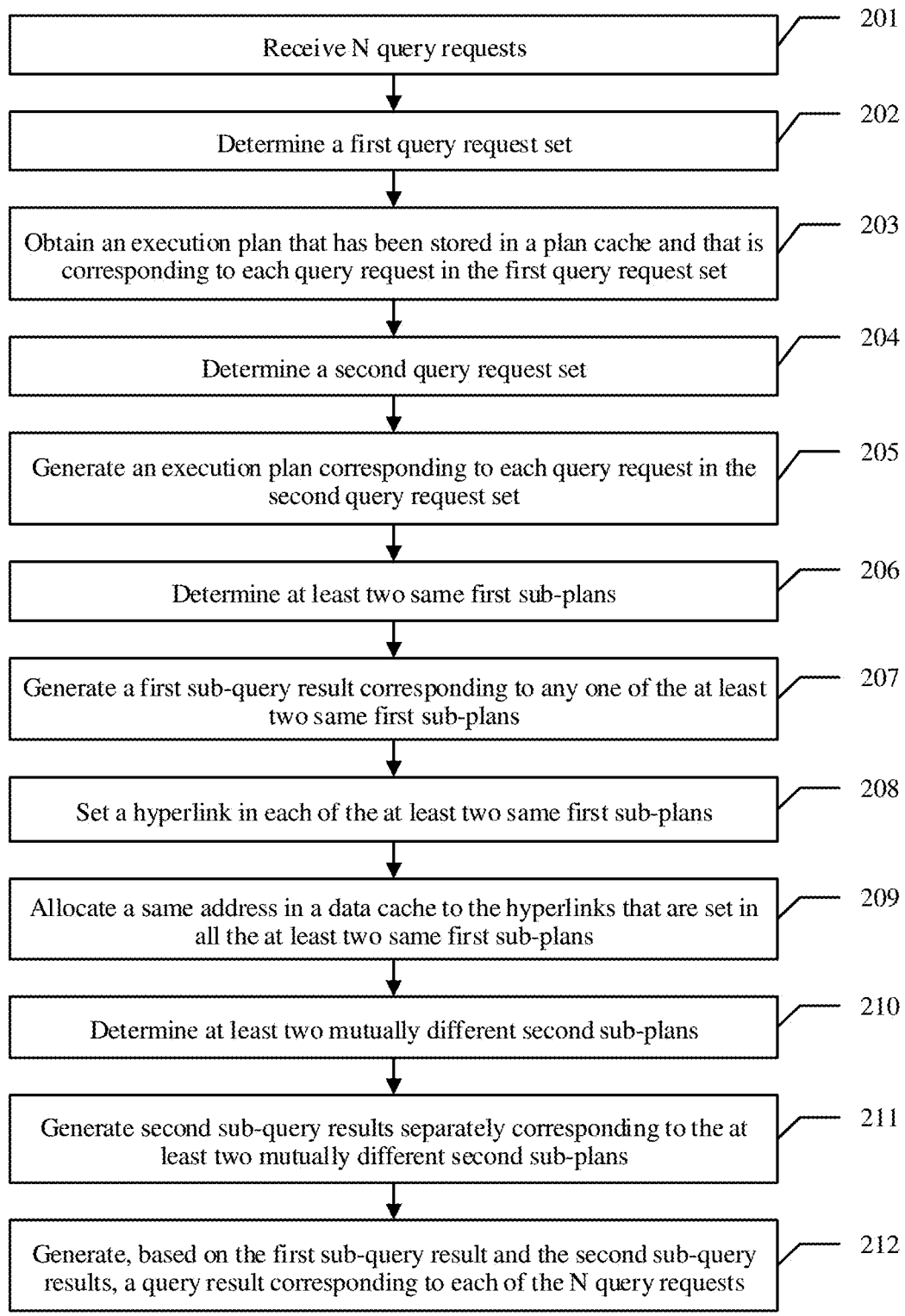
FIG. 2 is a step flowchart of an embodiment of a query method according to an embodiment of the present disclosure.

A query method shown in an embodiment is first described with reference to FIG. 2. FIG. 2 is a step flowchart of an embodiment of a query method according to an embodiment of the present disclosure.

Step 201: Receive N query requests.

A database system receives the N requests entered by a user, and N is a positive integer greater than 1.

Query requests in different data query application scenarios are different.

Further, the query request is not limited in this embodiment provided that the database system can query related data according to the query request.

For example, in a large-scale concurrent query application scenario of college entrance examination result query, the query request may be information such as a name or an admission ticket number of an examinee.

For another example, in a large-scale concurrent query application scenario of bank database system ad hoc query, the query request may be information such as a name or a job number of a staff, or query content.

A manner in which the database system further receives the N query requests is described in the following.

Optionally, in this embodiment, the database system may receive the query requests in a preset time period, and the database system may stop receiving the query request if the preset time period expires.

Duration of the preset time period is not limited in this embodiment provided that the preset time period is less than average query duration.

A process for determining the average query duration is as follows.

First, M received query requests are determined, and M is a positive integer greater than 1.

Further, before the database system performs the query method shown in this embodiment, the M query requests received by a database are first queried, and the M query requests are stored in a plan cache of the database system.

The M query requests stored in the plan cache of the database system are query requests that have been queried.

The M query requests that have been queried mean that the database system has generated, according to the M query requests, a query result corresponding to each of the M query requests.

The database system may calculate total duration in which the M query results are generated according to the M query requests, and the M query results are respectively corresponding to the M query requests.

The database system determines the average query duration, and the average query duration is the total duration in which the M query results are generated according to the M query requests/M.

The database system determines a preset time period, and the preset time period is less than the average query duration.

For example, if the database system determines that the average query duration is 3 seconds, the database system may determine that the preset time period is 0.1 second.

In this embodiment, the preset time period only needs to be far less than the average query duration, specific duration of the preset time period may vary with services that the query requests request to query.

In this embodiment, the database system may receive the N query requests in the preset time period, and the database system stops receiving the query request if the preset time period expires.

Optionally, a manner in which the database system receives the N query requests may be as follows.

The database system counts a quantity N of received query requests, the database system determines whether the quantity N of received query requests is less than a target quantity, and if yes, the database system may continue to receive the query request, or if no, the database system receives no more query requests.

The target quantity is not limited in this embodiment, and the target quantity may vary with services that the query requests request to query.

In an example for description in this embodiment, multiple query requests are received in the preset time period.

Step 202: Determine a first query request set.

The first query request set includes at least one of the N query requests, an execution plan corresponding to each query request in the first query request set has been stored in a plan cache, and the plan cache is used to store an execution plan corresponding to the at least one of the N query requests.

Further, a cache of the database system in this embodiment includes but is not limited to the plan cache, and the plan cache is used to store the execution plan.

The plan cache has pre-stored a queried query request and an execution plan corresponding to the queried query request.

After receiving the N query requests, the database system performs text-based search on all the N query requests one by one.

If the queried query request in the plan cache has same text as the at least one of the currently received N query requests, the first query request set is created. The first query request set includes the at least one of the N query requests that has the same text as the queried query request.

The plan cache stores the execution plan corresponding to each query request included in the first query request set.

Step 203: Obtain an execution plan that has been stored in a plan cache and that is corresponding to each query request in the first query request set.

If the plan cache has stored the execution plan corresponding to each query request in the first query request set, the database system determines the execution plan that has been stored in the plan cache and that is corresponding to each query request in the first query request set.

When the database system determines that the plan cache has stored the execution plan corresponding to each query request in the first query request set, the database system does not need to regenerate an execution plan corresponding to any query request in the first query request set.

The database system shown in this embodiment does not need to store a query result corresponding to the query plan in order to effectively save a database system resource.

Step 204: Determine a second query request set.

The second query request set includes at least one of the N query requests, and an execution plan corresponding to each query request in the second query request set is not stored in the plan cache.

The plan cache is used to store an execution plan corresponding to the at least one of the N query requests.

Further, a cache of the database system in this embodiment includes but is not limited to the plan cache, and the plan cache is used to store the execution plan.

After receiving the N query requests, the database system performs text-based search on all the N query requests one by one.

If the database system determines that a queried query request in the plan cache does not have same text as the at least one of the currently received N query requests, the second query request set is created. The second query request set includes the at least one of the N query requests that does not have the same text as the queried query request.

The plan cache does not store an execution plan corresponding to any query request included in the second query request set.

Optionally, an exit arrangement may be set for the plan cache shown in this embodiment.

The database system may determine duration in which an execution plan stored in the database system is not used. If the duration in which the stored execution plan is not used exceeds a specific threshold, the database system may delete the execution plan that is not used in the duration exceeding the specific threshold in order to effectively reduce storage space of the plan cache.

Step 205: Generate an execution plan corresponding to each query request in the second query request set.

After determining the second query request set, the database system may generate the execution plan corresponding to each query request in the second query request set.

Further, the database system generates, according to semantic and/or syntax analysis of each query request in the second query request set, the execution plan corresponding to each query request in the second query request set.

The execution plan is described in detail.

The execution plan defines steps and operations that need to be performed in a process in which the database system generates a query result so as to execute the query request corresponding to the execution plan.

The execution plan may be in a database command form in accordance with a database language such as a structured query language (SQL).

The database system generates a most efficient execution plan, that is, included steps and a sequence of performing the steps are determined in the execution plan.

Further, the execution plan includes multiple sub-plans, and the sub-plan further includes multiple operators.

Figure 3:
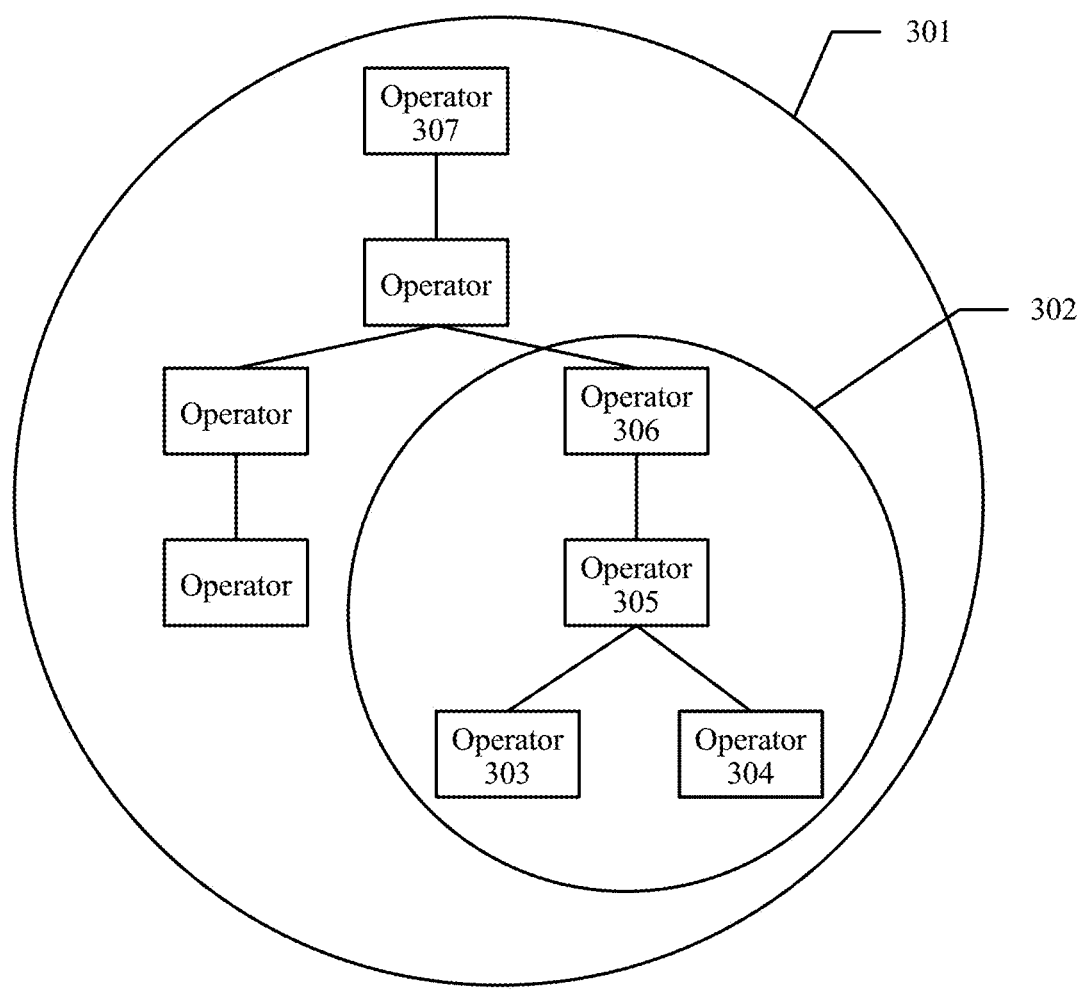
FIG. 3 is a schematic structural diagram of an embodiment of an execution plan, a sub-plan, and an operator according to an embodiment of the present disclosure.

For structures of the execution plan, the sub-plan, and the operator, refer to FIG. 3. FIG. 3 is a schematic structural diagram of an execution plan, a sub-plan, and an operator according to an embodiment of the present disclosure.

It should be noted that a quantity and a sorting manner of sub-plans and a quantity and a sorting manner of operators that are shown in FIG. 3 are only optional examples, and are not limited.

As shown in FIG. 3, an execution plan 301 includes multiple sub-plans 302, and each of the sub-plans 302 includes multiple operators.

The operators included in the sub-plan 302 shown in this embodiment are connected according to a tree structure. Each sub-plan includes an execution sequence and an invoking relationship of the operators.

The query request is executed in a top-to-bottom sequence of the operators included in each of the sub-plans.

In an optional example of this embodiment, the operators are connected according to the tree structure to form the sub-plan. In specific application, the operators may be connected according to another structure to form the sub-plan, and this is not limited in this embodiment.

The sub-plan 302 is used as an example.

Relative to an operator 305, an operator 303 and an operator 304 are lower-level operators, and the operator 305 is an upper-level operator.

The operator 303 and the operator 304 generate output results according to respective input, and output the output results to the operator 305. The output results output by the operator 303 and the operator 304 to the operator 305 are input for the operator 305.

Relative to an operator 306, the operator 305 is a lower-level operator, and the operator 306 is an upper-level operator.

The operator 305 generates an output result according to the input, and outputs the output result to the operator 306.

In brief, among operators of an execution plan, an operator that is executed earlier is a lower-level operator, an operator that is executed later is an upper-level operator, and an operator that is executed at last is a highest-level operator.

It can be learnt that each operator in the sub-plan completes an operation of the operator using a lower-level operator, and outputs an output result to an upper-level operator.

Further, as shown in FIG. 3, a highest-level operator 307 in the execution plan generates, according to input of a lower-level operator, the query result corresponding to the query request.

Step 206: Determine at least two same first sub-plans.

After all the N execution plans respectively corresponding to the N query requests in the preset time period are determined, the N execution plans may be traversed in order to determine the at least two same first sub-plans.

Further, the at least two same first sub-plans are different execution plans in the N execution plans, or the at least two same first sub-plans are same execution plans in the N execution plans, that is, the at least two same first sub-plans include a same operator, and operators in the at least two same first sub-plans have same execution sequences and invoking relationships.

Figure 4:
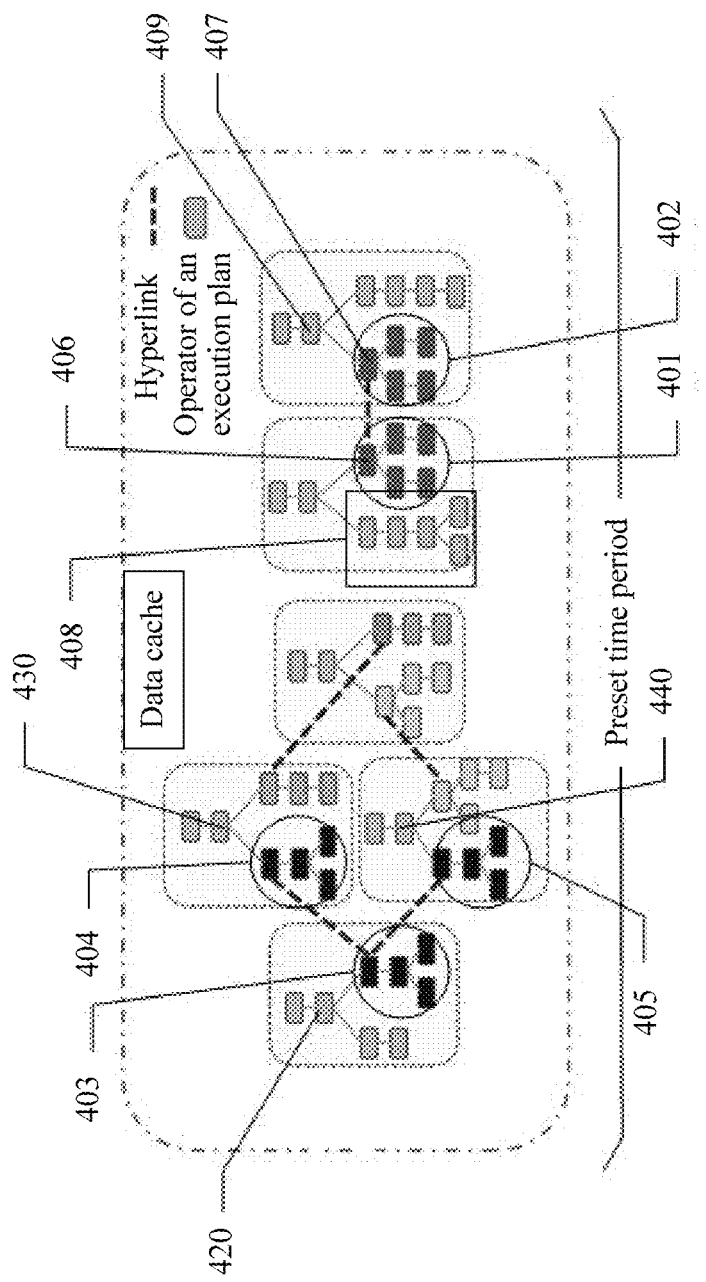
FIG. 4 is a schematic diagram of a query in an embodiment of a query method according to an embodiment of the present disclosure.

FIG. 4 is used as an example. A sub-plan 401 is the same as a sub-plan 402, and it is determined that the sub-plan 401 and the sub-plan 402 are first sub-plans.

It should be noted that, in an example for description in FIG. 4, the first sub-plan 401 and the first sub-plan 402 are different execution plans.

FIG. 4 is still used as an example. A first sub-plan 403, a first sub-plan 404, and a first sub-plan 405 are same first sub-plans.

It can be learnt that all same first sub-plans in the execution plan may be identified using step 205.

Step 207: Generate a first sub-query result corresponding to any one of the at least two same first sub-plans.

In this embodiment, the cache of the database system includes but is not limited to a data cache, and the data cache is used to store a query result.

After determining the at least two same first sub-plans, the database system may generate the first sub-query result. The first sub-query result is a query result corresponding to any one of the at least two same first sub-plans.

The data cache of the database system is used to cache the first sub-query result.

Further, in this embodiment, the database system selects any one of the at least two same first sub-plans, and saves a first sub-query result corresponding to the selected first sub-plan in the data cache. The database system shown in this embodiment does not generate a corresponding query result for another first sub-plan that is not selected.

Step 208: Set a hyperlink in each of the at least two same first sub-plans.

The hyperlink is used to indicate all same first sub-plans.

It can be learnt that the database system can determine all the same first sub-plans using the hyperlink.

For example, as shown in FIG. 4, the hyperlink is set in the first sub-plan 403, the first sub-plan 404, and the first sub-plan 405, and the database system can determine, using the hyperlink, that the first sub-plan 403, the first sub-plan 404, and the first sub-plan 405 are same first sub-plans.

How the database system sets the hyperlink in the first sub-plan is described in the following.

The hyperlink is set in a highest-level operator of each of the at least two same first sub-plans. The highest-level operator of each of the at least two same first sub-plans is the last operator executed in each of the at least two same first sub-plans.

FIG. 4 is still used as an example. If a highest-level operator that is executed at last in the first sub-plan 401 is an operator 406, the database system may set the hyperlink in the operator 406.

The database system may further determine, using the hyperlink in the first sub-plan 401, the first sub-plan 402 that is the same as the first sub-plan 401.

If a highest-level operator that is executed at last in the first sub-plan 402 is an operator 407, the database system may set the hyperlink in the operator 407.

Step 209: Allocate a same address in a data cache to the hyperlinks that are set in all the at least two same first sub-plans.

The database system may allocate the same address in the data cache to the hyperlinks of all the same first sub-plans such that input of upper-layer operators of all the same first sub-plans points to the same data cache, and a same first sub-query result is used for the same first sub-plans.

For example, as shown in FIG. 4, the first sub-plan 403, the first sub-plan 404, and the first sub-plan 405 are same first sub-plans.

Further with reference to FIG. 4, it can be learned that an upper-layer operator of the first sub-plan 403 is an operator 420, an upper-layer operator of the first sub-plan 404 is an operator 430, and an upper-layer operator of the first sub-plan 405 is an operator 440.

The same address in the data cache is allocated to the hyperlinks in the first sub-plan 403, the first sub-plan 404, and the first sub-plan 405, input of the upper-layer operator 420 of the first sub-plan 403, the upper-layer operator 430 of the first sub-plan 404, and the upper-layer operator 440 of the first sub-plan 405 points to the same data cache.

It should be noted that in this embodiment, allocating the same address in the data cache to the hyperlinks of all the same first sub-plans is an optional example, and is not limited provided that the database system can allocate the same address in the data cache to all the at least two same first sub-plans and the data cache has stored the first sub-query result corresponding to any one of the at least two same first sub-plans.

Step 210: Determine at least two mutually different second sub-plans.

The database system traverses the execution plans corresponding to the N query requests received in the preset time period, and determines second sub-plans in the execution plans. The second sub-plan is different from the sub-plan included in any execution plan.

Further, the at least two mutually different second sub-plans are different execution plans in the N execution plans, and/or the at least two mutually different second sub-plans are same execution plans in the N execution plans.

For example, in FIG. 4, a sub-plan 408 is a second sub-plan, that is, the second sub-plan 408 is different from a sub-plan of any execution plan.

It should be noted that a sequence of performing step 210 and steps 206 to 209 is not limited in this embodiment.

Step 211: Generate second sub-query results separately corresponding to the at least two mutually different second sub-plans.

After determining the at least two mutually different second sub-plans, the database system may generate the second sub-query results. The second sub-query results are query results separately corresponding to the at least two mutually different second sub-plans.

The data cache of the database system is used to cache the second sub-query results.

Step 212: Generate, based on the first sub-query result and the second sub-query results, a query result corresponding to each of the N query requests.

In this embodiment, the database system may create a running set, and the database system may add all the determined second sub-plans to the running set.

The database system further adds any one of the at least two same first sub-plans to the running set.

Further, the database system can dynamically associate all the same first sub-plans using the hyperlink in order to add any one of the dynamically associated first sub-plans to the running set.

It can be learnt that all sub-plans in the running set created by the database system are mutually different sub-plans.

Further, the database system executes all the sub-plans in the running set.

The database system calculates the first sub-query result corresponding to the first sub-plan in the running set.

In a process of generating, by the database system, the query results corresponding to the N query requests, a same first sub-query result corresponding to any one of the first sub-plans is used for all the same first sub-plans.

Further, the hyperlinks of all the same first sub-plans store the same address of the data cache, and the first sub-plan may directly read the data cache indicated by the hyperlinks in order to obtain the first sub-query result from the data cache. Therefore, a same first sub-query result corresponding to the first sub-plan is used for all the same first sub-plans.

For example, as shown in FIG. 4, the database system adds the first sub-plan 401 to the running set, and the database system obtains a first sub-query result corresponding to the first sub-plan 401.

In a process of executing the first sub-plan 402, the database system determines, using the hyperlink, that the first sub-plan 401 and the first sub-plan 402 are same first sub-plans.

Optionally, an upper-level operator 409 of the highest-level operator 407 of the first sub-plan 402 may directly obtain the first sub-query result corresponding to the first sub-plan 401 in the data cache.

The first sub-query result corresponding to the first sub-plan 401 is to be read by an upper-level operator in a non-blocking manner.

Optionally, the upper-level operator 409 of the highest-level operator 407 of the first sub-plan 402 may directly invoke an invoking function corresponding to the first sub-plan 401.

The second sub-query results corresponding to the second sub-plans are calculated.

If the query result corresponding to the query request needs to be obtained, each sub-plan included in the execution plan corresponding to the query request needs to be executed.

In this embodiment, the execution plans include the first sub-plans and/or the second sub-plans. The database system has obtained the first sub-query result corresponding to the first sub-plans and the second sub-query results corresponding to the second sub-plans.

It can be learnt that the database system has obtained the sub-query result corresponding to each sub-plan in the execution plan, and the database system may obtain, according to the sub-query result corresponding to each sub-plan, the query result corresponding to the query request.

For a specific process of obtaining the query results of the execution plans according to sub-query results of the sub-plans, refer to the other approaches. This is not described in this embodiment.

According to the query method shown in this embodiment, after executing queries of multiple query requests in a preset time period, a database system may continue to execute queries of multiple query requests in a next preset time period.

Beneficial effects of the query method shown in this embodiment are as follows.

1. According to the query method shown in this embodiment, multiple query requests are received in the preset time period so as to query data, and the preset time period lasts for an extremely short time. Hyperlinks are set in the at least two same first sub-plans in only one preset time period. When a query is completed in a preset time period, a query result stored in a data cache can be deleted. Therefore, storage load of a database system is relieved, and cache utilization of the database system is improved.

2. If a query request received in a preset time period is a queried query request, only an execution plan corresponding to the queried query request needs to be directly obtained such that duration for generating the execution plan is reduced.

3. When query plans corresponding to all query requests in a preset time period are determined, hyperlinks in at least two same first sub-plans may be obtained. The hyperlinks are used to indicate the at least two same first sub-plans, and a same address in a data cache is allocated to the hyperlinks of the at least two same first sub-plans. Input of upper-level operators of all the same first sub-plans points to the same data cache according to the hyperlinks such that a same first sub-query result is used for the same first sub-plans. It can be learnt that all the same first sub-plans are executed only once in order to avoid repeated calculation of the sub-plan. Therefore, data query efficiency and database system performance are improved.

It can be learnt that, according to the query method shown in this embodiment, a large amount of repeated calculation can be reduced, and a same query result corresponding to the sub-plan is used for same first sub-plans. Therefore, database system resources are reduced, and query efficiency and a throughput of a database system in a large-scale concurrent query application scenario are improved.

A specific structure of a query device provided in an embodiment is described with reference to FIG. 5. It should be noted that the query device shown in this embodiment can run a database system such that the query device can perform the query method shown in FIG. 2 in the embodiment. For specific description about the query method, refer to FIG. 2. Details are not described in this embodiment.

The query device includes a fourth determining unit 501 configured to determine M received query requests, where M is a positive integer greater than 1, a calculation unit 502 configured to calculate total duration in which M query results are generated according to the M query requests, where the M query results are respectively corresponding to the M query requests, a fifth determining unit 503 configured to determine average query duration, where the average query duration is the total duration in which the M query results are generated according to the M query requests/M, a sixth determining unit 504 configured to determine a preset time period, where the preset time period is less than the average query duration, and a first receiving unit 505 configured to receive N query requests, where N is a positive integer greater than 1.

Optionally, the first receiving unit 505 further includes a third determining module 5051 configured to determine whether a quantity N of received query requests is less than a target quantity, a fourth determining module 5052 configured to continue to receive a query request if the third determining module 5051 determines that the quantity N of received query requests is less than the target quantity, and a fifth determining module 5053 configured to receive no more query requests if the third determining module 5051 determines that the quantity N of received query requests is greater than or equal to the target quantity.

A first determining unit 506 is configured to determine N execution plans according to the N query requests. The N execution plans correspond one-to-one to the N query requests, and each of the N execution plans includes multiple sub-plans.

Optionally, the first determining unit 506 is further configured to receive the N query requests in the preset time period.

Optionally, the first determining unit 506 includes a first determining module 5061 configured to determine a first query request set, where the first query request set includes at least one of the N query requests, an execution plan corresponding to each query request in the first query request set has been stored in a plan cache, and the plan cache is used to store an execution plan corresponding to the at least one of the N query requests, and an obtaining module 5062 configured to obtain the execution plan that has been stored in the plan cache and that is corresponding to each query request in the first query request set.

Optionally, the first determining unit 506 includes a second determining module 5063 configured to determine a second query request set, where the second query request set includes at least one of the N query requests, an execution plan corresponding to each query request in the second query request set is not stored in a plan cache, and the plan cache is used to store an execution plan corresponding to the at least one of the N query requests, and a generation module 5064 configured to generate the execution plan corresponding to each query request in the second query request set.

A second determining unit 507 is configured to determine at least two same first sub-plans, and the at least two same first sub-plans are different execution plans in the N execution plans, or the at least two same first sub-plans are same execution plans in the N execution plans.

A first generation unit 508 is configured to generate a first sub-query result corresponding to any one of the at least two same first sub-plans such that the same first sub-query result is used for all the at least two same first sub-plans.

Optionally, the query device further includes a first allocation unit 509 configured to allocate a same address in a data cache to all the at least two same first sub-plans, where the data cache is used to store the first sub-query result corresponding to any one of the at least two same first sub-plans.

Optionally, the query device further includes a second allocation unit 510 configured to set a hyperlink in each of the at least two same first sub-plans, where the hyperlink is used to indicate all same first sub-plans.

The second allocation unit 510 is further configured to set the hyperlink in a highest-level operator of each of the at least two same first sub-plans, each of the at least two same first sub-plans includes multiple operators connected according to an execution sequence, a lower-level operator outputs a calculation result to an upper-level operator, and the highest-level operator of each of the at least two same first sub-plans is the last operator executed in each of the at least two same first sub-plans.

A third allocation unit 511 is configured to allocate the same address in the data cache to the hyperlinks that are set in all the at least two same first sub-plans.

A third determining unit 512 is configured to determine at least two mutually different second sub-plans, and the at least two mutually different second sub-plans are different execution plans in the N execution plans, and/or the at least two mutually different second sub-plans are same execution plans in the N execution plans.

A second generation unit 513 is configured to generate second sub-query results separately corresponding to the at least two mutually different second sub-plans.

A third generation unit 514 is configured to generate, based on the first sub-query result and the second sub-query results, a query result corresponding to each of the N query requests.

For specific beneficial effects of the query device shown in this embodiment, refer to the query method shown in FIG. 2. Details are not described in this embodiment.

Figure 5:
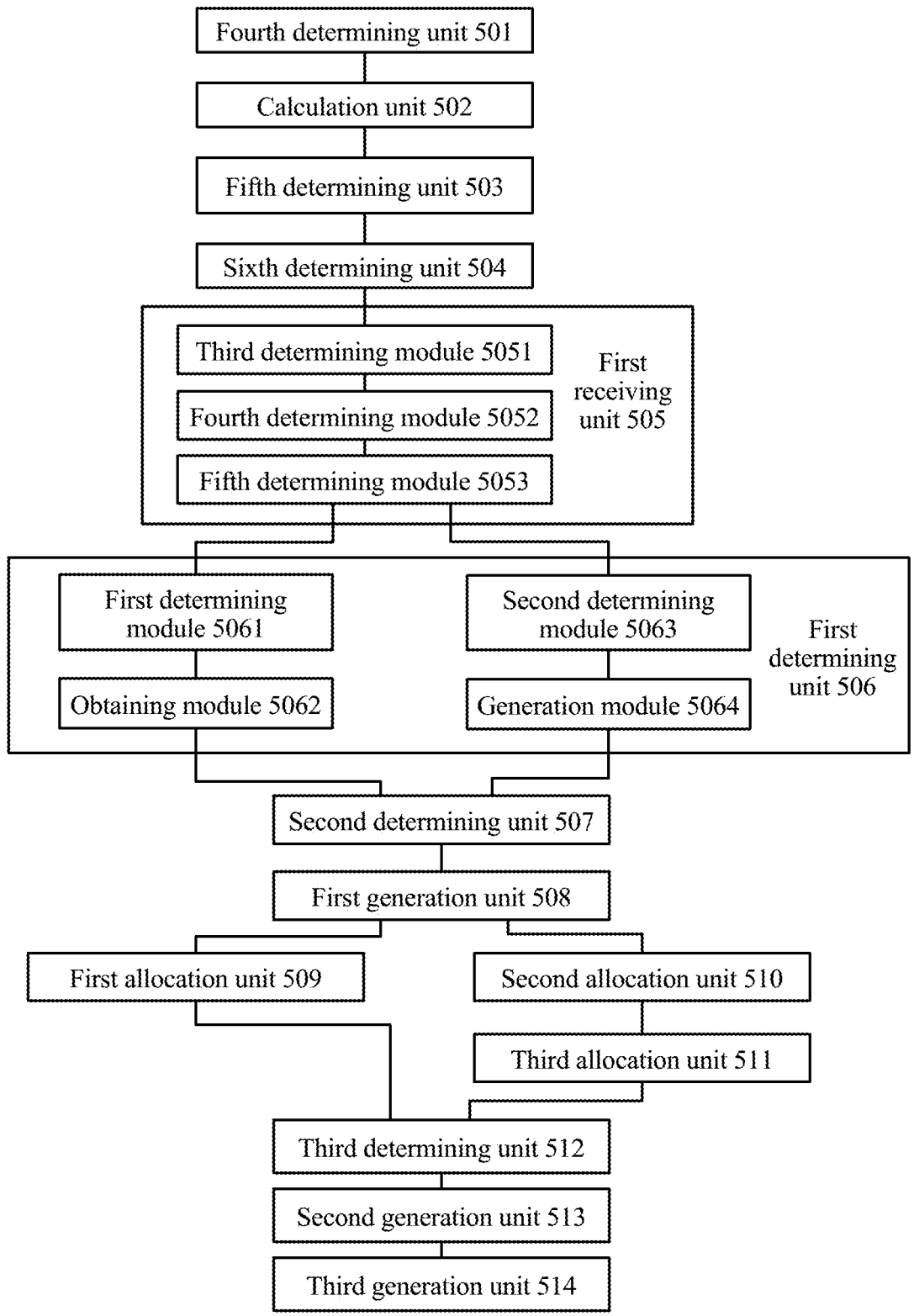
FIG. 5 is a schematic structural diagram of an embodiment of a query device according to an embodiment of the present disclosure.

In FIG. 5, the specific structure of the query device is described from a perspective of a functional module. The specific structure of the query device is described in the following with reference to FIG. 6 from a perspective of a hardware entity.

Figure 6:
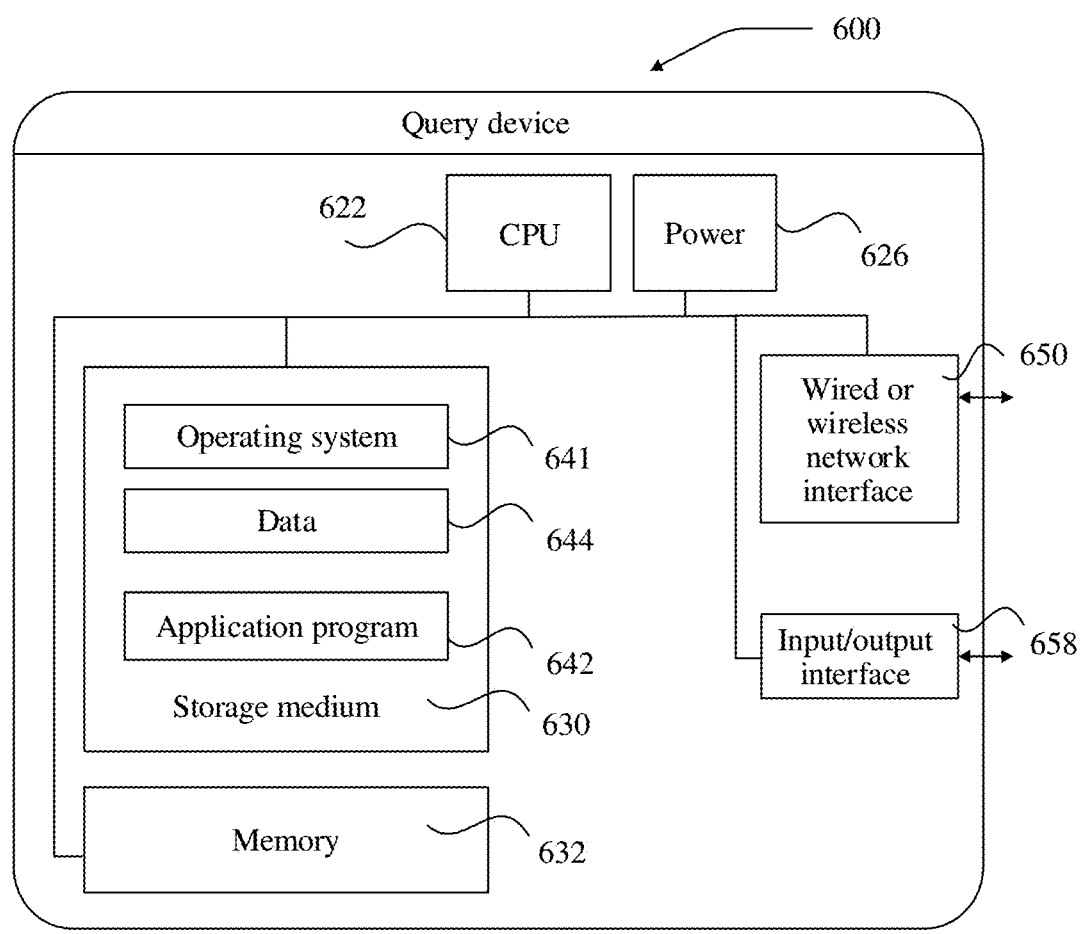
FIG. 6 is a schematic structural diagram of another embodiment of a query device according to an embodiment of the present disclosure.

FIG. 6 is a schematic structural diagram of a query device 600 according to an embodiment of the present disclosure. The query device 600 may have a relatively large difference because of a configuration difference or a performance difference, and may include one or more central processing units (CPUs) 622 (such as one or more processors), a memory 632, and one or more storage media 630 (such as one or more massive storage devices) that store an application program 642 or data 644.

The memory 632 and the storage medium 630 may perform transient or permanent storage. A program stored in the storage medium 630 may include one or more modules (not shown in the figure), and each module may include a series of instructions and operations for the query device.

Further, the CPU 622 may be set to communicate with the storage medium 630, and execute, on the query device 600, the series of instructions and operations in the storage medium 630.

The query device 600 may further include one or more powers 626, one or more wired or wireless network interfaces 650, one or more input/output interfaces 658, and/or one or more operating systems 641, such as WINDOWS SERVER™, Mac OS X™, UNIX™, LINUX™, FREEBSD™.

The input/output interface 658 is configured to receive N query requests, and N is a positive integer greater than 1.

The CPU 622 is configured to determine N execution plans according to the N query requests. The N execution plans correspond one-to-one to the N query requests, and each of the N execution plans includes multiple sub-plans.

The CPU 622 is configured to determine at least two same first sub-plans, and the at least two same first sub-plans are different execution plans in the N execution plans, or the at least two same first sub-plans are same execution plans in the N execution plans, the CPU 622 is configured to generate a first sub-query result corresponding to any one of the at least two same first sub-plans such that the same first sub-query result is used for all the at least two same first sub-plans.

The CPU 622 is configured to determine at least two mutually different second sub-plans, and the at least two mutually different second sub-plans are different execution plans in the N execution plans, and/or the at least two mutually different second sub-plans are same execution plans in the N execution plans.

The CPU 622 is configured to generate second sub-query results separately corresponding to the at least two mutually different second sub-plans.

The CPU 622 is configured to generate, based on the first sub-query result and the second sub-query results, a query result corresponding to each of the N query requests.

The CPU 622 is configured to determine a first query request set. The first query request set includes at least one of the N query requests, an execution plan corresponding to each query request in the first query request set has been stored in a plan cache, and the plan cache is used to store an execution plan corresponding to the at least one of the N query requests.

The CPU 622 is configured to obtain the execution plan that has been stored in the plan cache and that is corresponding to each query request in the first query request set.

The CPU 622 is configured to determine a second query request set. The second query request set includes at least one of the N query requests, an execution plan corresponding to each query request in the second query request set is not stored in a plan cache, and the plan cache is used to store an execution plan corresponding to the at least one of the N query requests.

The CPU 622 is configured to generate the execution plan corresponding to each query request in the second query request set.

The CPU 622 is configured to determine M received query requests, and M is a positive integer greater than 1.

The CPU 622 is configured to calculate total duration in which M query results are generated according to the M query requests, and the M query results are respectively corresponding to the M query requests.

The CPU 622 is configured to determine average query duration, and the average query duration is the total duration in which the M query results are generated according to the M query requests/M.

The CPU 622 is configured to determine a preset time period, and the preset time period is less than the average query duration.

The CPU 622 is configured to control the input/output interface 658 to receive the N query requests in the preset time period.

The CPU 622 is configured to determine whether a quantity N of received query requests is less than a target quantity.

The CPU 622 is configured to control the input/output interface 658 to continue to receive a query requests if the quantity N of received query requests is less than the target quantity.

The CPU 622 is configured to control the input/output interface 658 to receive no more query requests if the quantity N of received query requests is greater than or equal to the target quantity.

The CPU 622 is configured to allocate a same address in a data cache to all the at least two same first sub-plans, and the data cache is used to store the first sub-query result corresponding to any one of the at least two same first sub-plans.

After the CPU 622 is configured to generate the first sub-query result corresponding to any one of the at least two same first sub-plans, the CPU is further configured to set a hyperlink in each of the at least two same first sub-plans, where the hyperlink is used to indicate all same first sub-plans.

The CPU 622 is configured to set the hyperlink in a highest-level operator of each of the at least two same first sub-plans, each of the at least two same first sub-plans includes multiple operators connected according to an execution sequence, a lower-level operator outputs a calculation result to an upper-level operator, and the highest-level operator of each of the at least two same first sub-plans is the last operator executed in each of the at least two same first sub-plans.

The CPU 622 is configured to allocate a same address in the data cache to the hyperlinks that are set in all the at least two same first sub-plans.

For a specific process of performing a query method by the query device shown in this embodiment, refer to the embodiment shown in FIG. 2. Details are not described in this embodiment.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the other approaches, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A query method, comprising:
receiving N query requests, wherein the N comprises a positive integer greater than one;
determining N execution plans according to the N query requests, wherein the N execution plans correspond one-to-one to the N query requests, and wherein each of the N execution plans comprises a plurality of sub-plans;
determining at least two same first sub-plans, wherein the at least two same first sub-plans comprise different or same execution plans in the N execution plans;
generating a first sub-query result corresponding to any one of the at least two same first sub-plans, wherein the first sub-query result is used for all the at least two same first sub-plans;
determining at least two mutually different second sub-plans, wherein the at least two mutually different second sub-plans comprise different or same execution plans in the N execution plans;
generating second sub-query results separately corresponding to the at least two mutually different second sub-plans;
generating, based on the first sub-query result and the second sub-query results, a query result corresponding to each of the N query requests; and
setting, after generating the first sub-query result corresponding to any one of the at least two same first sub-plans, a hyperlink in each of the at least two same first sub-plans, wherein the hyperlink indicates all same first sub-plans.

2. The query method of claim 1, wherein determining the N execution plans comprises:
determining a first query request set, wherein the first query request set comprises at least one of the N query requests, wherein an execution plan corresponding to each query request in the first query request set is stored in a plan cache, and wherein the plan cache stores an execution plan corresponding to the at least one of the N query requests; and
obtaining the execution plan stored in the plan cache corresponding to each query request in the first query request set.

3. The query method of claim 1, wherein determining the N execution plans comprises:
determining a second query request set, wherein the second query request set comprises at least one of the N query requests, wherein an execution plan corresponding to each query request in the second query request set is not stored in a plan cache, and wherein the plan cache stores an execution plan corresponding to the at least one of the N query requests; and
generating the execution plan corresponding to each query request in the second query request set.

4. The query method of claim 1, wherein before receiving the N query requests, the query method further comprises:
determining M query requests, wherein the M comprises a positive integer greater than one;
calculating total duration in which M query results are generated according to the M query requests, wherein the M query results respectively correspond to the M query requests;
determining average query duration based on the total duration in which the M query results are generated according to the M query requests;
determining a preset time period, wherein the preset time period is less than the average query duration; and
receiving the N query requests in the preset time period.

5. The query method of claim 1, wherein receiving the N query requests comprises:
- determining whether a quantity of received query requests is less than a target quantity;
- continuing to receive a query request when the quantity of received query requests is less than the target quantity; and
- avoid receiving any more query requests when the quantity of received query requests is greater than or equal to the target quantity.

6. The query method of claim 1, wherein after generating the first sub-query result, the query method further comprises allocating a same address in a data cache to all the at least two same first sub-plans, and wherein the data cache stores the first sub-query result corresponding to any one of the at least two same first sub-plans.

7. The query method of claim 1 wherein setting the hyperlink in each of the at least two same first sub-plans comprises setting the hyperlink in a highest-level operator of each of the at least two same first sub-plans, and wherein each of the at least two same first sub-plans comprises a plurality of operators coupled according to an execution sequence, a lower-level operator outputting a calculation result to an upper-level operator, and the highest-level operator of each of the at least two same first sub-plans comprising a last operator executed in each of the at least two same first sub-plans.

8. The query method of claim 1 wherein after setting the hyperlink in each of the at least two same first sub-plans, the query method further comprises allocating a same address in a data cache to hyperlinks set in all the at least two same first sub-plans.

9. A query device, comprising:
- an input/output interface configured to receive N query requests, wherein the N comprises a positive integer greater than one; and
- a central processing unit (CPU) coupled to the input/output interface and configured to:
  - determine N execution plans according to the N query requests, wherein the N execution plans correspond one-to-one to the N query requests, and wherein each of the N execution plans comprises a plurality of sub-plans;
  - determine at least two same first sub-plans, wherein the at least two same first sub-plans comprises different or same execution plans in the N execution plans;
  - generate a first sub-query result corresponding to any one of the at least two same first sub-plans, wherein the first sub-query result is used for all the at least two same first sub-plans;
  - determine at least two mutually different second sub-plans, wherein the at least two mutually different second sub-plans comprise different or same execution plans in the N execution plans;
  - generate second sub-query results separately corresponding to the at least two mutually different second sub-plans;
  - generate, based on the first sub-query result and the second sub-query results, a query result corresponding to each of the N query requests; and
  - set a hyperlink in each of the at least two same first sub-plans, wherein the hyperlink indicates all same first sub-plans.

10. The query device of claim 9, wherein the CPU is further configured to:
- determine a first query request set, wherein the first query request set comprises at least one of the N query requests, wherein an execution plan corresponding to each query request in the first query request set is stored in a plan cache, and wherein the plan cache stores an execution plan corresponding to the at least one of the N query requests; and
- obtain the execution plan stored in the plan cache corresponding to each query request in the first query request set.

11. The query device of claim 9, wherein the CPU is further configured to:
- determine a second query request set, wherein the second query request set comprises at least one of the N query requests, wherein an execution plan corresponding to each query request in the second query request set is not stored in a plan cache, and wherein the plan cache stores an execution plan corresponding to the at least one of the N query requests; and
- generate the execution plan corresponding to each query request in the second query request set.

12. The query device of claim 9, wherein the CPU is further configured to:
- determine M query requests, wherein the M comprises a positive integer greater than one;
- calculate total duration in which M query results are generated according to the M query requests, wherein the M query results respectively correspond to the M query requests;
- determine average query duration, wherein the average query duration comprises the total duration in which the M query results are generated according to the M query requests;
- determine a preset time period, wherein the preset time period is less than the average query duration; and
- receive the N query requests in the preset time period.

13. The query device of claim 9, wherein the CPU is further configured to:
- determine whether a quantity of received query requests is less than a target quantity;
- continue to receive a query request when the quantity of received query requests is less than the target quantity; and
- avoid receiving any more query requests when the quantity of received query requests is greater than or equal to the target quantity.

14. The query device of claim 9, wherein the CPU is further configured to allocate a same address in a data cache to all the at least two same first sub-plans, and wherein the data cache stores the first sub-query result corresponding to any one of the at least two same first sub-plans.

15. The query device of claim 9 wherein the CPU is further configured to set the hyperlink in a highest-level operator of each of the at least two same first sub-plans, wherein each of the at least two same first sub-plans comprises a plurality of operators coupled according to an execution sequence, wherein a lower-level operator outputs a calculation result to an upper-level operator, and wherein the highest-level operator of each of the at least two same first sub-plans comprises a last operator executed in each of the at least two same first sub-plans.

16. The query device of claim 9, wherein the CPU is further configured to allocate a same address in a data cache to hyperlinks set in all the at least two same first sub-plans.

17. A computer program product comprising instructions stored on a non-transitory computer-readable medium that, when executed by a processor, cause a query device to:
- receive N query requests, wherein the N comprises a positive integer greater than one;
- determine N execution plans according to the N query requests, wherein the N execution plans correspond one-to-one to the N query requests, and wherein each of the N execution plans comprises a plurality of sub-plans;
- determine at least two same first sub-plans, wherein the at least two same first sub-plans comprise different or same execution plans in the N execution plans;
- generate a first sub-query result corresponding to any one of the at least two same first sub-plans, wherein the first sub-query result is used for all the at least two same first sub-plans;
- determine at least two mutually different second sub-plans, wherein the at least two mutually different second sub-plans comprise different or same execution plans in the N execution plans;
- generate second sub-query results separately corresponding to the at least two mutually different second sub-plans;
- generate, based on the first sub-query result and the second sub-query results, a query result corresponding to each of the N query requests; and
- set, after generating the first sub-query result corresponding to any one of the at least two same first sub-plans, a hyperlink in each of the at least two same first sub-plans, wherein the hyperlink indicates all same first sub-plans.

18. The computer program product of claim 17, wherein the instructions cause the query device to determine the N execution plans by:
- determining a first query request set, wherein the first query request set comprises at least one of the N query requests, wherein an execution plan corresponding to each query request in the first query request set is stored in a plan cache, and wherein the plan cache stores an execution plan corresponding to the at least one of the N query requests; and
- obtaining the execution plan stored in the plan cache corresponding to each query request in the first query request set.

19. The computer program product of claim 17, wherein the instructions cause the query device to determine the N execution plans by:
- determining a second query request set, wherein the second query request set comprises at least one of the N query requests, wherein an execution plan corresponding to each query request in the second query request set is not stored in a plan cache, and wherein the plan cache stores an execution plan corresponding to the at least one of the N query requests; and
- generating the execution plan corresponding to each query request in the second query request set.

20. The computer program product of claim 17, wherein before receiving the N query requests, the instructions cause the query device to:
- determine M query requests, wherein the M comprises a positive integer greater than one;
- calculate total duration in which M query results are generated according to the M query requests, wherein the M query results respectively correspond to the M query requests;
- determine average query duration based on the total duration in which the M query results are generated according to the M query requests;
- determine a preset time period, wherein the preset time period is less than the average query duration; and
- receive the N query requests in the preset time period.

* * * * *